(12) United States Patent
Zheng et al.

(10) Patent No.: US 6,201,887 B1
(45) Date of Patent: Mar. 13, 2001

(54) SYSTEM FOR DETERMINATION OF FAULTY CIRCUIT BOARDS IN ULTRASOUND IMAGING MACHINES

(75) Inventors: Yibin Zheng, Schenectady, NY (US); Bruce Richard Everling, Wales, WI (US); Lon Raymond Bischoff, South Milwaukee, WI (US); Terry Wayne Taylor, Delafield, WI (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/193,932

(22) Filed: Nov. 17, 1998

(51) Int. Cl.$^7$ .................................................. G06K 9/00
(52) U.S. Cl. .................................................. 382/128
(58) Field of Search .................................. 382/128, 130, 382/131; 702/159; 348/162, 163; 345/326, 333, 335, 145, 156, 158; 600/407, 424, 437, 443, 447

(56) References Cited

U.S. PATENT DOCUMENTS

| | | | |
|---|---|---|---|
| 4,159,462 | * 6/1979 | Rocha et al. | 367/97 |
| 5,538,004 | * 7/1996 | Bamber | 600/443 |
| 5,540,229 | * 7/1996 | Collet-Billon et al. | 600/443 |
| 5,622,170 | * 4/1997 | Schulz | 60/424 |
| 5,722,412 | * 3/1998 | Pfugrath et al. | 600/459 |
| 6,050,942 | * 4/2000 | Rust et al. | 600/437 |
| 6,130,641 | * 10/2000 | Kraeutner et al. | 342/179 |

OTHER PUBLICATIONS

Declaration signed by inventors.

* cited by examiner

Primary Examiner—Andrew W. Johns
Assistant Examiner—Shervin K. Nakhjavan
(74) Attorney, Agent, or Firm—Jill M. Breedlove; Douglas E. Stoner

(57) ABSTRACT

A method and apparatus are provided for identifying a failed receiver channel in an ultrasonic imaging system. The method includes the steps of identifying a location of an artifact on a display of the ultrasonic imaging system. The method further includes the steps of retrieving a set of receiver channel locations associated with the display and determining a channel associated with the identified artifact by matching an expected outline of a failed channel with the identified artifact.

44 Claims, 4 Drawing Sheets

LINEAR PROBE

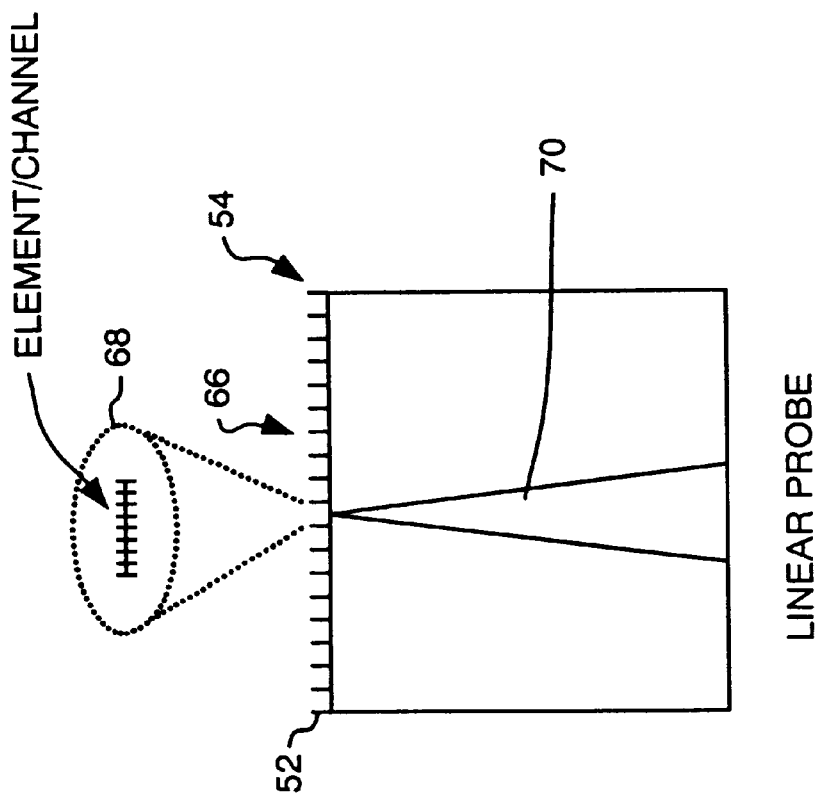
FIG. 3 CURVED PROBE
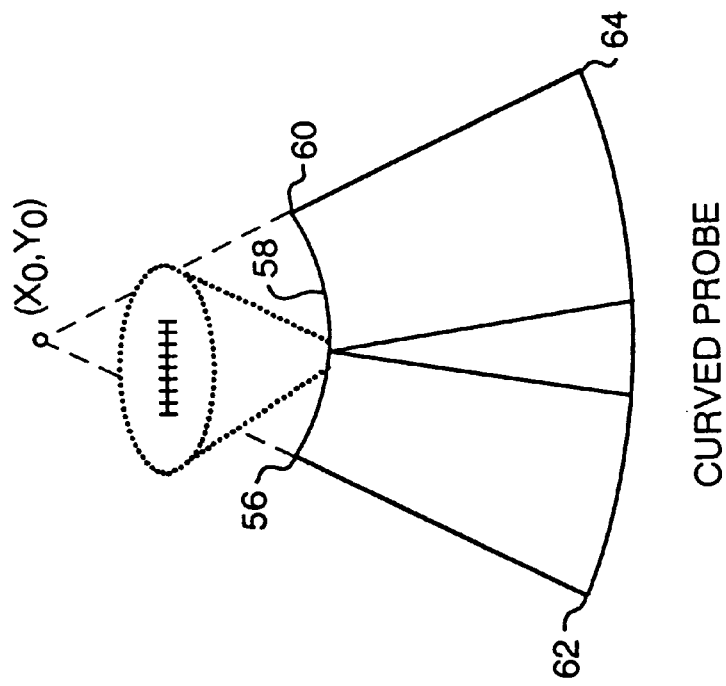
FIG. 2 LINEAR PROBE

SYSTEM FOR DETERMINATION OF FAULTY CIRCUIT BOARDS IN ULTRASOUND IMAGING MACHINES

BACKGROUND OF THE INVENTION

The present invention relates generally to medical imaging devices, and more particularly to ultrasound imaging devices.

Ultrasonic imaging devices generally provide images of an object under observation using ultrasonic waves. Ultrasonic imaging devices provide valuable information about the object under observation. Ultrasonic imaging devices, however, can be difficult to troubleshoot. Images displayed by such devices are typically created using a relatively large number of parallel processing channels. Information gathered from an array element of an ultrasonic transducer on any one of the parallel processing channels is typically presented on a display, in an overlapping manner with information from adjacent channels. Beamforming (i.e. the process by which data generated by an ultrasonic beam is manipulated to produce a readable image) contributes to the complexity of processing and to troubleshooting.

Because of the signal contribution of array elements to many different pixels of an image, service personnel are often required to resort to trial and error in identifying failed circuit components. Trial and error results in increased cost and extends the time that a respective ultrasonic imaging device is out of service.

Accordingly, a need exists for identifying failed elements within ultrasonic imaging devices so as to minimize downtime thereof.

BRIEF SUMMARY OF THE INVENTION

A method and apparatus are provided for identifying a failed receiver channel in an ultrasonic imaging system. The method includes the steps of identifying a location of an artifact on a display of the ultrasonic imaging system. The method further includes the steps of retrieving a set of receiver channel locations associated with the display and determining a channel associated with the identified artifact by matching a receiver location of the set of receiver locations with the location of the identified artifact.

The method and apparatus of automatically identifying a source of artifacts provides an important benefit to operators and service technicians. Not only can a technician more easily troubleshoot and identify a failed channel, but the tool may also be used in the case of multiple inoperative channels or in the case of channels experiencing intermittent malfunctions.

BRIEF DESCRIPTION OF THE DRAWINGS

FIG. 2 depicts a selected area of interest of the display of a linear probe of the analyzer system of FIG. 1;

FIG. 3 depicts a selected area of interest of a display of a curved probe of the analyzer system of FIG. 1;

DETAILED DESCRIPTION OF THE INVENTION

Figure 1:
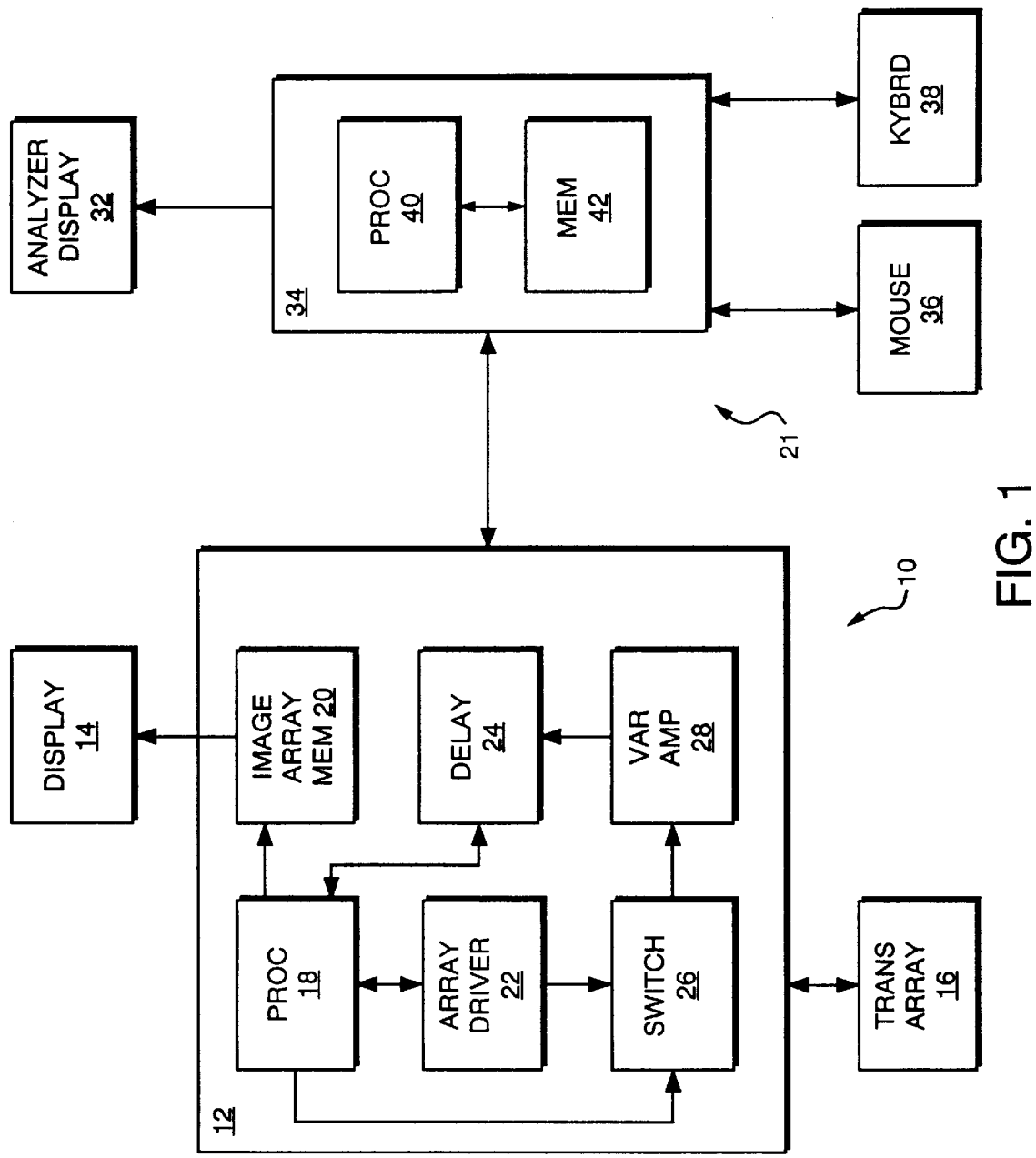
FIG. 1 depicts a block diagram of an ultrasonic imaging system and analyzer system in accordance with one embodiment of the invention.

FIG. 1 depicts a block diagram of an ultrasonic imaging system 10 and a system analyzer 21. The imaging system 10 produces ultrasonic images that are illustrated on a display device 14 (e.g., a CRT) based upon signals detected by an ultrasonic transducer array 16. The imaging system comprises any commercially available ultrasonic imaging system (e.g., a GE LOGIQ 700™ system available from General Electric Company).

The ultrasonic imaging system 10 generates images in a conventional manner. The ultrasonic transducer 16 is placed against a portion of a body of a subject (not shown). Ultrasonic pulses are generated by the ultrasonic transducer array 16 and transmitted into the body of the subject. Sound penetrating the subject propagates through the subject and is reflected by relatively dense structures within the subject's body. The reflected sound is detected by the transducer array 16 between transmitted pulses. The reflected sound from the pulses is processed by an ultrasonic control unit 12 to generate images based upon the reflected sound.

Within the ultrasonic control unit 12, a processor 18 is provided for pulse generation. Pulses generated by the processor are gated to the transducer array 16 through the array driver 22 and switch 26.

The switch 26 is typically a two-position programmable switch. In a first position the switch 26 allows a set of array drive signals to be transferred from an array driver 22 to the transducer array 16. In a second position, the switch 26 provides for the transfer of any reflected signals from the array elements to a channel amplifier 28.

The transducer 16 is typically an array of 128 piezoelectric elements. For each pixel element generated on the display 14, a subset of the elements (aperture) are activated and electronically focused to receive an echo at different depths. As depth increases, the number of activated elements or the aperture size also increases. The aperture is stepped through the image width to form a complete image.

To form a beam on transmission, the processor 18 typically loads a binary sequence from memory 20. The sequence may be a subroutine, which subroutine causes a sequence of drive signals to be sent to the array elements with a pre-determined timing relationship. Alternatively, the binary sequence may be a beamforming bit sequence residing in a lookup table where each bit of the binary sequence represents an instantaneous drive control signal for a respective piezoelectric element.

To form a receive beam, the processor 18 generates a signal to sequentially sample each of the 128 transducer elements. Based upon time of arrival of the received samples, the processor 18 causes each set of samples to be subject to an amplification factor based upon a logarithmic scale.

The amplified samples are then subjected to a processing algorithm, which algorithm generates a two-dimensional image. A beam is formed along a particular line extending outwards from the transducer 16 and, by adjusting the aperture, pixel values are formed at each point extending outwards along the line. The angle of the formed beam is then changed and the process is repeated.

Pixels determined from the formed beam are stored in memory 20 as part of a pixel image array. As new pixels are calculated from information received from the transducer 16, the new pixels are overwritten over previously calculated pixels.

Figure 4:
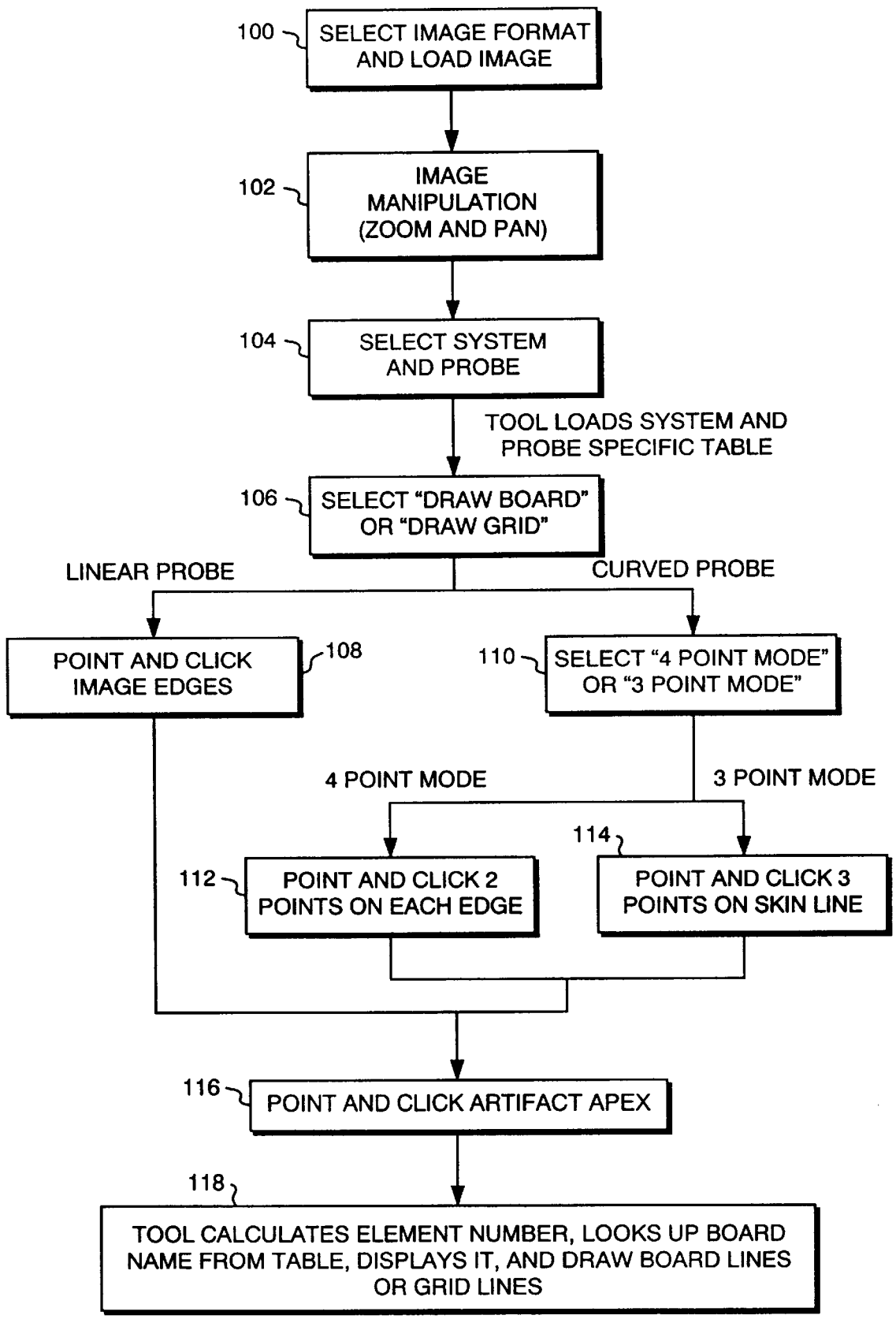
FIG. 4 is a flow chart of operation of the analyzer system of FIG. 1.

Under the illustrated embodiment of the invention, the system analyzer 21 uses the generated image as a basis for analysis and detection of a failed channel. FIG. 4 depicts a flow chart of the steps necessary to identify the element associated with the failed channel.

Where a processing element of a channel between a transducer of the transducer array 16 (FIG. 1) and display fails, the failed element reduces the echo energy of a triangular area where the channel contributes to pixel values. Because there is not a one-for-one relationship between array element output and pixel values, the identification of a failed channel is difficult and time consuming without the aid of the system analyzer 21.

FIGS. 2–3 depict an image appearing on the analyzer display 32 under conditions in which a channel failure has occurred for a linear and curved probe. An image artifact is typically associated with a failed element and is shown in the central portion of FIGS. 2–3.

To identify the failed element, the analyzer 21 (FIG. 1) first prompts an operator (not shown) for information about the file format of the imaging system 10. The operator enters information identifying an image format and the diagnostic analyzer 21 downloads pixel values of the image (step 100 of FIG. 4) from the image array memory 20. This selection is entered into the analyzer 21 by "clicking" the appropriate item identified on the analyzer display 32 using the mouse 36 or alternatively the keypad 38 (FIG. 1). It is to be understood that throughout this Specification a selection is made by the operator by "clicking" the appropriate item identified on the analyzer display 32 using the mouse 36 or alternatively the keypad 38.

The analyzer 21 prompts the operator by the display of a menu offering an appropriate set of choices. The operator selects the image format (step 100 of FIG. 4) as being stored under any of a number of formats (e.g., Joint Photographic Expert's Grove (JPEG), Tagged Image File Format (TIFF), bitmap, or the like) by selection of an appropriate softkey.

After downloading the image, the image is presented on an analyzer display 32 (FIG. 1) for the benefit of the operator. The operator, using the mouse and an appropriate set of softkeys pans across the image to focus on a particular portion of the image having unusual characteristics or artifacts. The operator may zoom in on a particular portion of the image (step 102 of FIG. 4).

In order to further identify the failed element, the analyzer 21 prompts the operator for an identifier of the imager 12 (e.g., a GE LOGIQ700™), and an identifier of the transducer array 16, for example, a GE 739L™, GE LA39™, or the like (step 104 of FIG. 4).

Different ultrasonic systems typically have different numbers of elements on the transducer 16 and therefore different channels and channel layouts. The identification of the imager and transducer allows the analyzer 21 to accommodate differences in imagers 12.

Following selection of the imager 12 and transducer 16, the analyzer 21 loads a data file specific to the imager 12 and the transducer 16 from memory 42. The analyzer 21 then prompts the operator to enter a "Draw Board" or "Draw Grid" option (step 106 of FIG. 4). The draw board option prompts the analyzer 21 to place a single pair of vertical lines on an upper edge of the image indicative of a single circuit board responsible for the artifact. The draw grid option causes the processor 40 to place a series of vertical lines 66 across the top of the display (FIG. 2) indicative of that portion of the display provided by any of a respective circuit board. In either case, the processor 40 is adapted to identify the failed board typically within a graphical user interface (GUI), as further described below.

Depending upon the type of transducer 16 selected in step 104 of FIG. 4, the operator is then asked to identify an area of an image for analysis. If the transducer is a linear probe, the operator is asked to identify the x-coordinates $(x_1,x_2)$ of a right and left edge 52, 54 of an area of interest (step 108 of FIG. 4). If a curved probe were identified to the analyzer 21 (FIG. 3), then the operator may be prompted to identify the area of interest to the analyzer 21 by one of two possible methods (step 110 of FIG. 4).

Where the portion of the image displayed (FIG. 3) is from a curved probe, the operator is prompted to identify the x-y coordinates $(x_1,y_1; x_2,y_2; x_3,y_3)$ of three points (step 114 of FIG. 4), for example, coordinates represented by points of interest 56, 58, 60, representing a skin surface of a patient. Alternatively, the operator is prompted to identify the x-y coordinates $(x_1,y_1; x_2,y_2; x_3,y_3; x_4,y_4)$ of opposing corners, for example, coordinates represented by points 56, 60, 62, 64, of the area of interest of FIG. 3 (step 112 of FIG. 4).

Using the three and alternatively the four x-y coordinates, the processor 40 determines a set of x-y coordinates $(x_0,y_0)$ of an apex of a fan represented by the area of interest of FIG. 3. In the case of three x-y coordinates, the processor 40 determines the coordinates $(x_0,y_0)$ based upon the assumption that the three selected coordinates are equidistant from the apex. The x-coordinate of the apex is solved using the coordinates selected above through use of the equality:

$$X_0=(x_1+x_3)/2.$$

The y-coordinate of the apex may similarly be solved using the selected coordinates through use of the equality:

$$y_0=((x_2-x_3)/2)((x_1-x_2)/(y_1-y_2))+(y_1,y_2)/2)$$

In the case of four coordinates, the processor 40 operates under the assumption that two coordinates forming the left edge 56, 62 and the two coordinates forming the right edge 60, 64 each form a line that passes through the apex. The processor 40 then solves for the coordinates of the apex at the point where the two lines intersect. Using the left and right edge coordinates, the processor 40 solves for the coordinates $x_0$ and $y_0$ as follows:

$$T_1=(x_2-x_1)/(y_2-y_1),$$

$$T_2=(x_3-x_4)/(y_3-y_4),$$

$$y_0=(x_1-t_1y_1-x_4-t_2y_4)/(t_2-t_1),$$

$$x_0=x_1+(y_0-y_1).$$

As a last step by the operator, the analyzer 21 prompts the operator to identify an x-y coordinate of an artifact 70 within the area of interest (step 116 of FIG. 4). The processor 40 stores the point (x,y) identifying the artifact 70 in memory 42.

Using the coordinates of the artifact 70, the processor 40 identifies a circuit board and a transducer element (channel element) associated with the artifact. The processor 40 identifies the channel element by correlating the location of the artifact 70 with a location of the channel element. Correlating the artifact 70 to the channel element is accomplished by finding a channel element(s) whose imaging outline substantially surrounds the artifact 70. The channel element whose image substantially surrounds the artifact 70 is defined as the channel element within the graphical user interface (GUI).

Using the coordinate of the artifact 70 (x,y), the processor 40 functions to determine a transducer element index, (I), which element index identifies the channel element. In the case of the linear probe, the processor uses the left edge coordinate and right edge coordinate of the area of interest to provide the transducer element index, (I), using the equality as follows:

$$I=((x-x_1)/(x_2-x_1))N,$$

where N is the number of transducer elements in the transducer array 16 and $x_1$, $x_2$ and $x_3$ are selected coordinates.

Where the curved probe is used, the determination of the transducer element index, (I), is based upon the location of the apex and location of the artifact 70. The determination is made based upon selected and determined coordinates using the equation as follows:

$$I=N((\arctan(y-y_0)/(x-x_0))-(\arctan(y_1-y_0)/(x_1-x_0))/(\arctan(y_3-y_0)/(x_3-x_0))-(\arctan(y_1-y_0)/(x_1-x_0))).$$

Using the transducer element index, (I), a circuit board is easily and quickly identified by looking up the system and transducer specific table. Once the transducer element index, (I), is identified, an identifier of the channel and circuit board is displayed in the GUI of the analyzer display 32 (step 118 of FIG. 4).

In another embodiment of the invention, the processor 40 functions to localize the artifact 70 to a more specific area of the analyzer display 32. A pixel value of the selected coordinate x,y is determined and compared with surrounding pixel values. Surrounding pixel values within a predetermined threshold value of the selected coordinate x,y is included as part of the artifact 70.

Alternatively, the processor 40 attempts to identify an edge of the artifact 70 using well-known edge detection routines. For example, the processor 40 scans horizontally from the identified location of the artifact 70 x,y until it detects an edge of the artifact 70 based upon a pixel value difference in adjacent pixels or groups of near-adjacent pixels. Where the pixel value difference exceeds a pixel threshold value, the processor 40 marks that image location as a first edge of the artifact 70.

The processor 40 then moves up or down to again begin scanning horizontally while comparing pixel values. Where a second edge point is detected, the processor 40 draws a line between detected edge locations. The process 40 continues until the processor 40 has substantially outlined the artifact 70.

Once the processor 40 has outlined the artifact 70, the processor 40 may then begin searching for channel identifiers associated with the location of the identified artifact 70. The search for channel identifiers may include fitting an expected outline of a failed channel with the detected outline of the artifact 70. The outlines of two or more failed channels may be combined to provide an overall outline that matches that detected by the processor 40.

Figure 5:
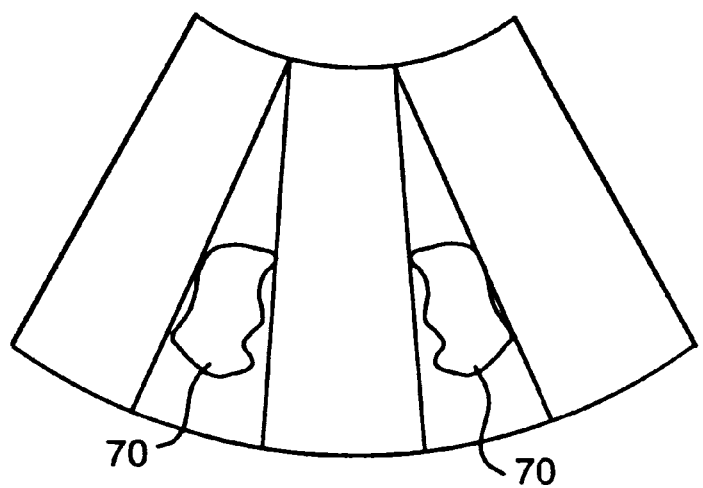
FIG. 5 depicts a display of FIG. 1 showing multiple artifacts.
Figure 6:
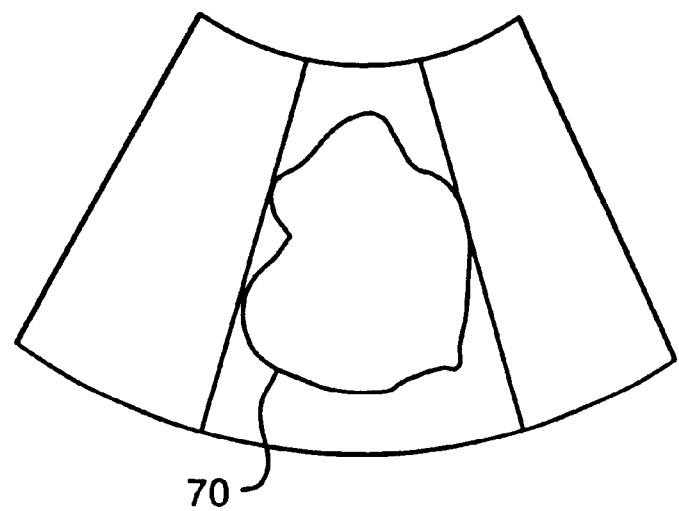
FIG. 6 depicts a display of FIG. 1 showing a large artifact.

For example, FIG. 5 shows an example where a display may show more than one artifact. In the case of two artifacts (FIG. 5), the user would click on each artifact 70 and the processor 40 would function to provide a set of channel identifiers that would create such a situation. Where the artifact 70 is large (FIG. 6), the processor 40 functions to provide a set of channel identifiers that may combine to produce the artifact 70 detected.

A method and apparatus for constructing an analyzer for a ultrasonic imaging system according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. A method of identifying a failed receiver channel in an ultrasonic imaging system, said method comprising the steps of:

identifying a location of an artifact on a display of said ultrasonic imaging system;

retrieving a set of receiver channel locations associated with the display; and determining a channel associated with an identified artifact by matching a receiver location of the set of receiver locations with the location of the identified artifact.

2. The method of identifying a failed channel in an ultrasonic imaging system as in claim 1 wherein the step of identifying the location of the artifact further comprises moving a pointer across the display to a location of the artifact and clicking with an input device.

3. The method of identifying a failed channel in an ultrasonic imaging system as in claim 2 wherein the step of clicking on the artifact further comprises correlating the click location to a display location.

4. The method of identifying a failed channel in an ultrasonic imaging system as in claim 3 further comprising determining a size and shape of the artifact.

5. The method of identifying a failed channel in an ultrasonic imaging system as in claim 4 wherein the step of determining a size and shape of the artifact further comprises determining a periphery of the artifact.

6. The method of identifying a failed channel in an ultrasonic imaging system as in claim 5 wherein the step of correlating to a display location further comprises determining a transducer contributing to the artifact with the determined periphery.

7. The method of identifying a failed channel in an ultrasonic imaging system as in claim 1 further comprising selecting an area of interest on the display surrounding the artifact.

8. The method of identifying a failed channel in an ultrasonic imaging system as in claim 7 wherein the step of selecting an area of interest further comprises determining an apex of the area of interest by solving an equation as follows, $x_0=(x_1+x_3)/2$.

9. The method of identifying a failed channel in an ultrasonic imaging system as in claim 7 wherein the step of selecting an area of interest further comprises determining an apex by solving an equation as follows, $y_0=((x_2+x_3)/2))((x_1-x_2)(y_1-y_2))+((y_1-y_2)/2)$.

10. The method of identifying a failed channel in an ultrasonic imaging system as in claim 7 wherein the step of selecting an area of interest further comprises determining an apex by solving an equation as follows, $T_1=(x_2-x_1)/(y_2-y_1)$.

11. The method of identifying a failed channel in an ultrasonic imaging system as in claim 7 wherein the step of selecting an area of interest further comprises determining an apex by solving an equation as follows, $T_2=(x_3-x_4)/(y_3-y_4)$.

12. The method of identifying a failed channel in an ultrasonic imaging system as in claim 7 wherein the step of selecting an area of interest further comprises determining an apex by solving an equation as follows, $y_0=(x_1-t_1y_1-x_4-t_2y_4)/(t_2+t_1)$.

13. The method of identifying a failed channel in an ultrasonic imaging system as in claim 7 wherein the step of selecting an area of interest further comprises determining an apex by solving an equation as follows, $x_0=x_1+(y_0-y_1)$.

14. The method of identifying a failed channel in an ultrasonic imaging system as in claim 1 further comprising determining a transducer element index.

15. The method of identifying a failed channel in an ultrasonic imaging system as in claim 14 wherein the step of determining the transducer element index further comprises solving an equation as follows: $I=((x-x_1)/(x_2-x_1))N$.

16. The method of identifying a failed channel in an ultrasonic imaging system as in claim 14 wherein the step of determining the transducer element index further comprises solving an equation as follows: $I=N((\arctan(y-y_0)(x-x_0))-(\arctan(y-y_0)/(x_1-x_0))/(\arctan(y_3-x_0))-(\arctan(y_1-y_0)/(x_1-x_0)))$.

17. Apparatus for identifying a failed receiver channel in an ultrasonic imaging system, said apparatus comprising:
   means for identifying a location of an artifact on a display of said ultrasonic imaging system;
   means for retrieving a set of receiver channel locations associated with the display; and
   means for determining a channel associated with the identified artifact by matching a receiver channel location of the set of receiver channel locations with the location of the artifact.

18. The apparatus for identifying a failed channel in an ultrasonic imaging system as in claim 17 wherein the means for identifying the artifact further comprises means provided on the display for clicking on the artifact.

19. The apparatus for identifying a failed channel in an ultrasonic imaging system as in claim 18 wherein the means for clicking on the artifact further comprises means for correlating the click location to a display location.

20. The apparatus for identifying a failed channel in an ultrasonic imaging system as in claim 19 further comprising means for determining a size and shape of the artifact.

21. The apparatus for identifying a failed channel in an ultrasonic imaging system as in claim 19 wherein the means for correlating a display location further comprises means for determining a transducer contributing to the artifact with the determined periphery.

22. The apparatus for identifying a failed channel in an ultrasonic imaging system as in claim 20 wherein the means for determining a size and shape of the artifact further comprises means for determining a periphery of the artifact.

23. The apparatus for identifying a failed channel in an ultrasonic imaging system as in claim 17 further comprising means for selecting an area of interest on the display surrounding the artifact.

24. Apparatus for identifying a failed receiver channel in an ultrasonic imaging system, said apparatus comprising:
   a display which displays a location of an artifact of said ultrasonic imaging system;
   a memory which stores a set of receiver channel locations associated with the display; and
   a display processor which determines a channel associated with the displayed artifact by matching the location of the artifact with a receiver location of the set of receiver locations.

25. The apparatus for identifying a failed channel in an ultrasonic imaging system as in claim 24 wherein the display adapted to identify the artifact further comprises a pointer provided on the display and an input device for clicking on the artifact.

26. The apparatus for identifying a failed channel in an ultrasonic imaging system as in claim 25 wherein the pointer and input device for clicking on the artifact further comprises a coordinate processor adapted for correlate the click location to a display location.

27. The apparatus for identifying a failed channel in an ultrasonic imaging system as in claim 26 wherein the coordinate processor adapted to correlate a display location further comprises a lookup table adapted to determine a transducer contributing to the artifact with the determined periphery.

28. The apparatus for identifying a failed channel in an ultrasonic imaging system as in claim 24 further comprising an image processor adapted to determine a size and shape of the artifact.

29. The apparatus for identifying a failed channel in an ultrasonic imaging system as in claim 28 wherein the image processor adapted to determine a size and shape of the artifact further comprises an edge detector adapted to determine a periphery of the artifact.

30. A method of identifying a failed receiver channel in an ultrasonic imaging system, said method comprising the steps of:
   identifying a location of an artifact on a display of said ultrasonic imaging system by identifying at least three points to define a curve;
   retrieving a set of receiver channel locations associated with the display; and
   determining a channel associated with the identified artifact by matching a receiver location of the set of receiver locations with the location of the identified artifact.

31. The method of identifying a failed channel in an ultrasonic imaging system as in claim 30 wherein the step of identifying the location of the artifact further comprises moving a pointer across the display to a location of the artifact and clicking with an input device.

32. The method of identifying a failed channel in an ultrasonic imaging system as in claim 31 wherein the step of clicking on the artifact further comprises correlating the click location to a display location.

33. The method of identifying a failed channel in an ultrasonic imaging system as in claim 32 further comprising determining a size and shape of the artifact.

34. The method of identifying a failed channel in an ultrasonic imaging system as in claim 33 wherein the step of determining a size and shape of the artifact further comprises determining a periphery of the artifact.

35. The method of identifying a failed channel in an ultrasonic imaging system as in claim 34 wherein the step of correlating to a display location further comprises identifying a curved probe transducer contributing to the artifact with the determined periphery.

36. The method of identifying a failed channel in an ultrasonic imaging system as in claim 30 further comprising selecting an area of interest on the display surrounding the artifact.

37. The method of identifying a failed channel in an ultrasonic imaging system as in claim 36 wherein the step of selecting an area of interest further comprises determining an apex of the area of interest by solving an equation as follows, $x_0=(x_1+x_3)/2$.

38. The method of identifying a failed channel in an ultrasonic imaging system as in claim 36 wherein the step of selecting an area of interest further comprises determining an apex by solving an equation as follows, $y_0=((x_2+x_3)/2))((x_1-x_2)(y_1-y_2))+((y_1+y_2)/2)$.

39. The method of identifying a failed channel in an ultrasonic imaging system as in claim 36 wherein the step of selecting an area of interest further comprises determining an apex by solving an equation as follows, $T_1=(x_2-x_1)/(y_2-y_1)$.

40. The method of identifying a failed channel in an ultrasonic imaging system as in claim 36 wherein the step of selecting an area of interest further comprises determining an apex by solving an equation as follows, $T_2=(x_3-x_4)/(y_3-y_4)$.

41. The method of identifying a failed channel in an ultrasonic imaging system as in claim 36 wherein the step of selecting an area of interest further comprises determining an apex by solving an equation as follows, $y_0=(x_1-t_1y_1-x_4t_2y_4)/(t_2+t_1)$.

42. The method of identifying a failed channel in an ultrasonic imaging system as in claim 30 further comprising determining a curved probe transducer element index.

43. The method of identifying a failed channel in an ultrasonic imaging system as in claim 42 wherein the step of determining the curved probe transducer element index further comprises solving an equation as follows: $I=((x-x_1)/(x_2-x_1))N$.

44. The method of identifying a failed channel in an ultrasonic imaging system as in claim 42 wherein the step of determining the curved probe transducer element index further comprises solving an equation as follows: $I=N((\arctan(y-y_0)(x-x_0))-(\arctan(y-y_0)/(x_1-x_0))/(\arctan(y_3-x_0)-(\arctan(y_1-y_0)/(x_1-x_0)))$.

* * * * *